(12) United States Patent
Ryu et al.

(10) Patent No.: US 8,455,123 B2
(45) Date of Patent: Jun. 4, 2013

(54) SAFETY SWITCH USING HEAT SHRINKAGE TUBE AND SECONDARY BATTERY INCLUDING THE SAME

(75) Inventors: Ji Heon Ryu, Seoul (KR); Jeong Hee Choi, Busan (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 512 days.

(21) Appl. No.: 12/309,505

(22) PCT Filed: Jul. 14, 2007

(86) PCT No.: PCT/KR2007/003410
§ 371 (c)(1),
(2), (4) Date: Oct. 9, 2009

(87) PCT Pub. No.: WO2008/010654
PCT Pub. Date: Jan. 24, 2008

(65) Prior Publication Data
US 2010/0047674 A1    Feb. 25, 2010

(30) Foreign Application Priority Data

Jul. 18, 2006 (KR) ........................ 10-2006-0066647

(51) Int. Cl.
*H01M 10/50* (2006.01)

(52) U.S. Cl.
USPC .............................................. 429/62; 429/61

(58) Field of Classification Search
USPC ......................................... 429/61, 62, 90, 93
See application file for complete search history.

(56) References Cited

U.S. PATENT DOCUMENTS

| | | | |
|---|---|---|---|
| 5,766,793 A * | 6/1998 | Kameishi et al. | ............... 429/62 |
| 6,570,749 B1 | 5/2003 | Ling et al. | |
| 6,899,972 B2 | 5/2005 | Cho | |
| 2001/0019255 A1 * | 9/2001 | Park | .............................. 320/116 |
| 2001/0043138 A1 * | 11/2001 | Furuta et al. | ................... 337/167 |
| 2004/0096732 A1 | 5/2004 | Shin et al. | |
| 2008/0129440 A1 * | 6/2008 | Ho | ..................... 337/5 |

FOREIGN PATENT DOCUMENTS

| | | |
|---|---|---|
| JP | 2003-243036 A | 8/2003 |
| JP | 2005-285429 A | 10/2005 |
| KR | 19920015681 | 8/1992 |
| KR | 100241232 B1 | 2/2000 |
| KR | 10-2006-0054635 A | 5/2006 |

* cited by examiner

*Primary Examiner* — Ula C Ruddock
*Assistant Examiner* — Scott J Chmielecki
(74) *Attorney, Agent, or Firm* — Lerner, David, Littenberg, Krumholz & Mentlik, LLP

(57) ABSTRACT

Disclosed herein is a safety switch including a tube that is capable of shrinking when exposed to temperatures in excess of a predetermined temperature level ("heat shrinkage tube"), wherein the length of the heat shrinkage tube is changeable to control current conduction, one end of the heat shrinkage tube is fixed, and the other end of the heat shrinkage tube is connected to an electric wire connection part, such that current conduction or current interruption is accomplished by the change in length of the heat shrinkage tube when the heat shrinkage tube is varied due to heat. When a battery or a battery pack is exposed to an abnormal environment, with the result that the temperature of the battery or the battery pack exceeds a predetermined temperature level, the heat shrinkage tube of the safety switch shrinks to directly interrupt external charge current, thereby preventing the further charge of the battery or the battery pack. Furthermore, internal energy accumulated in the battery cell is forcibly consumed, thereby fundamentally preventing the progress of the abnormal operation of the battery or the battery pack. Consequently, the safety of the battery is secured.

13 Claims, 5 Drawing Sheets

SAFETY SWITCH USING HEAT SHRINKAGE TUBE AND SECONDARY BATTERY INCLUDING THE SAME

CROSS REFERENCE TO RELATED APPLICATIONS

The present application is a national phase entry under 35 U.S.C. §371 of International Application No. PCT/KR2007/003410, filed Jul. 14, 2007, published in English, which claims the benefit of Korean Patent Application No. KR10-2006-0066647, filed Jul. 18, 2006. The disclosures of said applications are incorporated by reference herein.

FIELD OF THE INVENTION

The present invention relates to a safety switch including a tube that is capable of shrinking when exposed to temperatures in excess of a predetermined temperature level ("heat shrinkage tube"), and, more particularly, to a safety switch constructed in a structure in which the length of the heat shrinkage tube is changeable to control current conduction, one end of the heat shrinkage tube is fixed, and the other. end of the heat shrinkage tube is connected to an electric wire connection part, such that current conduction or current interruption is accomplished by the change in length of the heat shrinkage tube when the heat shrinkage tube is varied due to heat, whereby, when the internal temperature of the battery is excessively increased, due to the abnormal operation of the battery, with the result that the battery is overheated, the heat shrinkage tube shrinks to operate the safety switch, such that external charge current is interrupted, and therefore, the further charge of the battery is prevented, thereby greatly improving the safety of the battery.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

Based on the construction of an electrolyte, a lithium secondary battery may be classified as a lithium-ion battery, a lithium-ion polymer battery, or a lithium polymer battery. The lithium-ion battery is a battery constructed in a structure in which an electrode assembly having a cathode/separator/anode arrangement is impregnated with a lithium electrolytic solution, and the lithium polymer battery is a battery constructed in a structure in which a solid electrolyte is used as the electrolyte such that the solid electrolyte serves as a separator. The lithium-ion polymer battery is a battery taking a middle position between the lithium-ion battery and the lithium polymer battery. Specifically, the lithium-ion polymer battery is constructed in a structure in which a cathode and an anode are coupled to a separator, and the coupling region thereof is impregnated with a lithium electrolytic solution.

Based on the shape of a battery case, the lithium secondary battery may be classified as a cylindrical battery, a prismatic battery, or a pouch-shaped battery. The cylindrical battery or the prismatic battery is a battery constructed in a structure in which an electrode assembly is mounted in a metal container. The pouch-shaped battery is a battery constructed in a structure in which an electrode assembly is mounted in a pouch-shaped case made of an aluminum laminate sheet.

One of the major problems to be solved in connection with such a battery is to improve the safety of the battery. For example, the lithium secondary battery may explode due to high temperature and high pressure in the battery, which may be caused by the abnormal operation of the battery, such as an internal short circuit of the battery, overcharge of the battery exceeding allowable current. and voltage, exposure of the battery to high temperature, dropping of the battery, or deformation of the battery due to external impact.

Consequently, a matter which must be essentially considered when developing the lithium secondary battery is to secure the safety of the battery. Various attempts have been made to secure the safety of the battery. For example, Japanese Patent Application Publication No. 2005-285429 discloses a secondary battery, having a nonaqueous electrolyte, constructed in a structure in which heat shrinkage resin is used as a means for applying shear stress to an anode current collector having a region where an anode active material is not formed, and the part of the anode current collector opposite to a cathode active material, in the region where the anode active material is not formed, is weakened when an aluminum-lithium alloy is formed, during the overcharge of the battery, whereby the current is interrupted by cutting the part. However, the above-described technology has a problem in that the overheating of the battery continues until the Al—Li alloy is formed, and the interruption of current introduced from the outside of the battery is possible only after the alloy formation region is sufficiently formed, and therefore, the current collector is cut, whereby it is not possible to secure the reliable operation of the battery.

Also, Japanese Patent Application Publication No. 2003-243036 discloses a cylindrical secondary battery constructed in a structure in which an insulation layer, made of a heat shrinkage material, is disposed between a core and a cathode or anode current collecting ring, and the core and the current collecting ring are brought into contact with each other, when the battery is abnormal, whereby electrode current flows, and therefore, the current in the electrodes is interrupted. However, the insulation layer is meaningful only for a cylindrical battery constructed in a structure in which it is difficult to mount a safety member to the outside of the battery.

On the other hand, Korean Patent Application Publication No. 2006-0054635 discloses a lithium secondary battery including a cap assembly, which has a safety bent and a current interrupting device, constructed in a structure in which the current interrupting device further includes a heat shrinkage film formed in a predetermined shape, one end of the heat shrinkage film is fixed between an outside ring and an insulation ring, the heat shrinkage film has a cutout part of a predetermined shape to allow a bimetal to contact the safety bent, and the heat shrinkage film insulates the bimetal and the safety bent when the temperature of the battery is increased. According to this technology, however, the bimetal and the safety bent are insulated by the heat shrinkage film, with the result that, when any one of them malfunctions, the operation of the battery is not performed. Furthermore, the inclusion of the bimetal and the safety bent complicates the manufacturing process and increases the manufacturing costs.

Consequently, there is a high necessity for a device to rapidly and sensitively interrupt external charge current when the abnormality of the battery occurs.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have developed a safety switch that uses a heat shrinkage tube as an operating device, and found that, when the temperature of a battery exceeds a predetermined temperature level, the heat shrinkage tube shrinks to reliably interrupt external charge current or forcibly consume energy accumulated in a battery cell, thereby greatly improving the safety of the battery. The present invention has been completed based on these findings.

In accordance with one aspect of the present invention, the above and other objects can be accomplished by the provision of a safety switch including a tube that is capable of shrinking when exposed to temperatures in excess of a predetermined temperature level ("heat shrinkage tube"), wherein the length of the heat shrinkage tube is changeable to control current conduction, one end of the heat shrinkage tube is fixed, and the other end of the heat shrinkage tube is connected to an electric wire connection part, such that current conduction or current interruption is accomplished by the change in length of the heat shrinkage tube when the heat shrinkage tube is varied due to heat.

Specifically, when a battery or a battery pack is exposed to an abnormal environment, with the result that the temperature of the battery or the battery pack exceeds a predetermined temperature level due to the temperature outside the battery or the battery pack or heat generated in the battery or the battery pack, the heat shrinkage tube shrinks to operate the switch of the battery. As a result, external charge current is interrupted or internal energy accumulated in the battery cell is consumed through current interruption or current conduction, whereby the safety of the battery is secured. Consequently, the safety switch can operate rapidly and sensitively with a high reliability when the battery is abnormally operated. Also, the safety switch is not constructed in the form of a circuit, and therefore, the safety switch can operate even when a circuit of the battery is abnormal, and it is not necessary to modify a circuit related to the operation of the battery.

The heat shrinkage tube of the safety switch may be constructed in various structures so long as the heat shrinkage tube is capable of shrinking when exposed to temperatures in excess of a predetermined temperature level such that the safety switch can be mechanically operated depending upon the change of environment temperature. For example, the heat shrinkage tube may be constructed in the shape of a circle, an ellipse, a rectangle, or a triangle in horizontal section. However, the heat shrinkage tube is not limited to the above-specified shapes.

In a preferred embodiment, the heat shrinkage tube is constructed in an elliptical or rectangular hollow structure in horizontal section. In this case, a support member, as a fixing shaft, is located at one side of the elliptical or rectangular hollow structure, in the elliptical or rectangular hollow structure, and a variable member, connected to the electric wire connection part, is located at the other side of the elliptical or rectangular hollow structure, in the elliptical or rectangular hollow structure.

Consequently, when the battery or the battery pack is overheated, the heat shrinkage tube shrinks to convert the electric wire connection part into a current interruption state or a current conduction state. When the temperature of the battery cell is lowered to the normal temperature level for various reasons, on the other hand, the heat shrinkage tube expands to its original state, thereby restoring the electric wire connection part into a current conduction state or a current interruption state.

The material for the heat shrinkage tube is not particularly restricted so long as the heat shrinkage tube has a property of shrinking when exposed to temperatures in excess of a predetermined temperature level. For example, the heat shrinkage tube may be made of one or more materials selected from a group consisting of polyethylene, polypropylene, polyvinyl chloride, polyethylene terephthalate, ethylene propylene rubber, isoprene rubber, chloroprene rubber, styrene butadiene rubber, nitrite butadiene rubber, and Teflon. Preferably, the heat shrinkage tube is made of polyvinyl chloride.

The temperature at which the shrinkage of the heat shrinkage tube is initiated may be changed depending upon the construction of a battery. Preferably, the heat shrinkage tube shrinks at a temperature of at least 60 to 120° C. Generally, a lithium secondary battery operates at a temperature of less than 60° C. in a normal state. For this reason, the heat shrinkage tube preferably shrinks at a temperature of more than 60° C., at which the lithium secondary battery is abnormally operated. When the internal temperature of the lithium secondary battery exceeds 120° C., on the. other hand, the lithium secondary battery may explode. Consequently, it is not possible to secure the safety of the lithium secondary battery when the heat shrinkage tube does not shrink at a temperature of 120° C.

In accordance with another aspect of the present invention, there is provided a secondary battery having the safety switch with the above-stated construction, as a member for securing the safety of the battery when the battery is overheated ("safety member"), mounted at the outside of a battery cell.

The secondary battery according to the present invention may be constructed in various structures. For example, an electrode assembly may be constructed in a jelly-roll type structure or a stacking type structure. The battery may be mounted in a cylindrical container, a prismatic container, or a battery case made of a laminate sheet including a metal layer and a resin layer. The construction of the secondary battery is well known in the art to which the present invention pertains, and therefore, a detailed description thereof will not be given.

For example, the safety switch may be connected to a cathode terminal and/or an anode terminal of the battery cell, as external input and output terminals of the battery cell. Consequently, the electric wire connection part is directly connected to the electrode terminal, and therefore, the safety switch operates rapidly and sensitively to allow current conduction or current interruption in the battery cell when the battery is abnormally operated.

In a preferred embodiment, the electric wire connection part is in current conduction (ON) during the normal operation of the battery cell, and the electric wire connection part is brought into current interruption (OFF) such that the current is interrupted, due to shrinkage of the heat shrinkage tube of the safety switch, when the battery cell is overheated, controlling the charge condition of the battery cell. In this case, the safety switch may be referred to as a charge switch.

Specifically, when the heat shrinkage tube shrinks, due to the overheating of the battery cell, with the result that the connection with the electrode terminal is cut off, the electric wire connection part, which is in current conduction (ON), is converted into the current interruption (OFF) state. When the temperature of the battery cell is lowered to the normal temperature level for various reasons, on the other hand, the heat shrinkage tube expands to restore the connection with the electrode terminal, whereby the electric wire connection part is returned to the current conduction (ON) state.

In another preferred embodiment, the electric wire connection part is in current interruption (OFF) during the normal operation of the battery cell, and the electric wire connection part is brought into current conduction (ON), due to shrinkage of the heat shrinkage tube of the safety switch, when the battery cell is overheated, thereby controlling the discharge condition of the battery cell. In this case, the safety switch may be referred to as a discharge switch.

The electric wire connection part of the discharge switch is opposite in structure and operating principle to the electric wire connection part of the charge switch, which was previously described; however, the electric wire connection part of the discharge switch is identical to the electric wire connection part of the charge switch in the aspect of securing the safety of the battery through the current conduction of the battery cell.

When a battery includes the discharge switch, the battery may be constructed in a structure in which the electric wire connection part connects the cathode terminal and the anode terminal of the battery cell in series with each other, and at least one resistor is connected between the electric wire connection part and the corresponding electrode terminal.

Consequently, when the battery is abnormally operated, with the result that the battery is overheated to more than a critical level, the current conduction occurs at the discharge switch, and therefore, the current conduction also occurs at the resistor. As a result, electric energy accumulated in the battery cell is consumed by the resistor.

The resistor may emit heat, during the current conduction at the electric wire connection part, to consume charge energy of the battery cell, thereby reducing internal energy accumulated in the battery cell. In this case, a large amount of internal electric energy accumulated in the battery cell is consumed through the current conduction. Consequently, a great quantity of heat may be generated from the resistor due to the resistance of the resistor. For this reason, it is necessary to effectively dissipate heat generated by the current conducted during the forced discharge, and therefore, it is preferable that the resistor be located at a region outside the battery cell where the influence due to the heat emission is minimized.

According to circumstances, the resistance value of the resistor may be controlled to control the degree of the forced discharge. The resistance value of the resistor may be decided within a predetermined range which is greater than the sum of the resistance of wires used to connect the resistor and the resistance of the safety switch but is not excessively high. When the resistance value is too small, severe heat may be generated, with the result that the battery may explode due to instantaneous discharge. When the resistance value is too large, on the other hand, the discharge speed is reduced, with the result that the safety of the battery is not improved.

In a preferred embodiment, the resistance value is set based on the capacity and voltage of the battery such that the total capacity of the battery is discharged in 10 seconds at the minimum to 10 hours at the maximum. Consequently, the allowable range of the resistance value may be changed depending upon the voltage of the battery or the capacity of the battery.

For example, the resistance value may be set, such that the battery is discharged with a current of 720 A to 0.2 A, to mount the safety switch according to the present invention to a battery of 4 V/2 Ah. At this time, the total resistance value, including the resistance values of the resistor, the safety switch, and the wires, must be within 5 mΩ and 20Ω. Preferably, the resistance value is set such that the battery is discharged in 1 minute to 2 hours. In this case, a current of 120 A to 1 A flows in the battery, and the total resistance value is set to 33 mΩ and 4Ω. Also, as previously described, the resistance values of the safety switch and the wires are necessary to be set to less than half the resistance value of the resistor.

In accordance with a further aspect of the present invention, there is provided a battery pack including the safety switch with the above-stated construction. Consequently, the safety switch according to the present invention may be applied to a small-sized battery pack having a battery cell mounted in a pack case or a middle- or large-sized battery pack constructed in a structure in which two or more battery cells, stacked with high integration, are mounted in a pack case as unit cells.

Especially, the lithium secondary battery according to the present invention is preferably used as a unit cell for a high-output, large-capacity battery or battery pack having a safety-related problem, which is seriously caused by the overheating. The battery pack is preferably used as a power source for vehicles requiring an excellent high temperature storage property, such as electric vehicles or hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
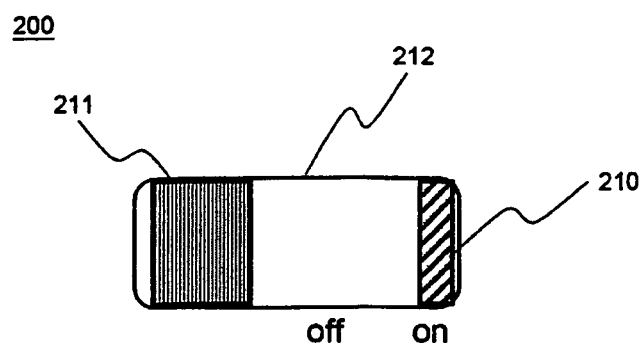
FIGS. 1 and 2 are typical views illustrating the operating principle of a safety switch (charge switch) according to a preferred embodiment of the present invention.
Figure 2:
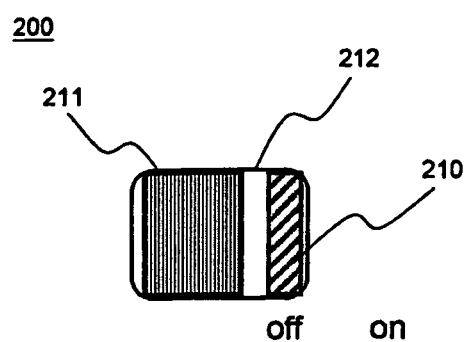

FIGS. 1 and 2 are typical views illustrating the operating principle of a safety switch according to a preferred embodiment of the present invention. Specifically, FIG. 1 illustrates the state of the safety switch, during the normal operation of the battery, before the operation of the safety switch is performed, and FIG. 2 illustrates the state of the safety switch, when the battery is abnormally operated, after the operation of the safety switch is performed. For convenience of description, the safety switch shown in FIGS. 1 and 2 will be hereinafter referred to as a charge switch.

Referring to FIGS. 1 and 2, the safety switch 200 is constructed in a structure in which one side of a heat shrinkage tube 212 is fixed by a support shaft 211, and the other side of the heat shrinkage tube 212 is connected to an electric wire connection part 210. The length of the heat shrinkage tube 212 is decreased with the increase of the temperature. Consequently, the electric wire connection part 210 is in current conduction (ON) during the normal operation of the battery as shown in FIG. 1; however, the electric wire connection part 210 is brought into current interruption (OFF), due to the shrinkage of the heat shrinkage tube 212, when the battery is overheated as shown in FIG. 2.

Figure 3:
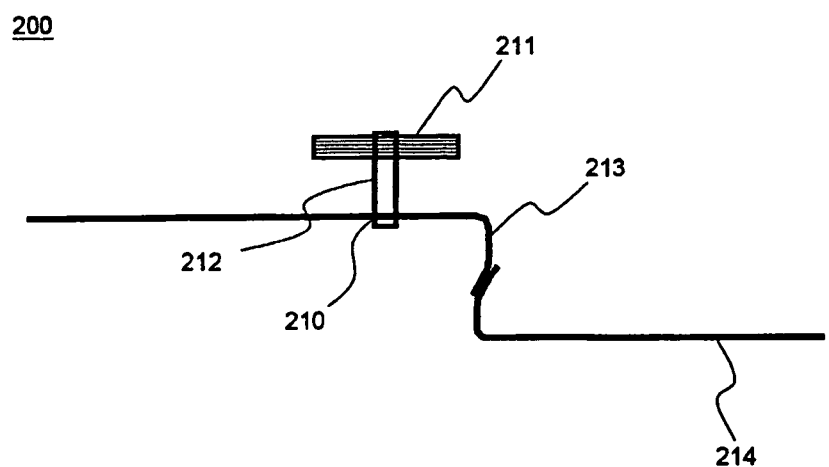
FIGS. 3 and 4 are typical views illustrating the concrete operating principle of the charge switch shown in FIG. 1.
Figure 4:
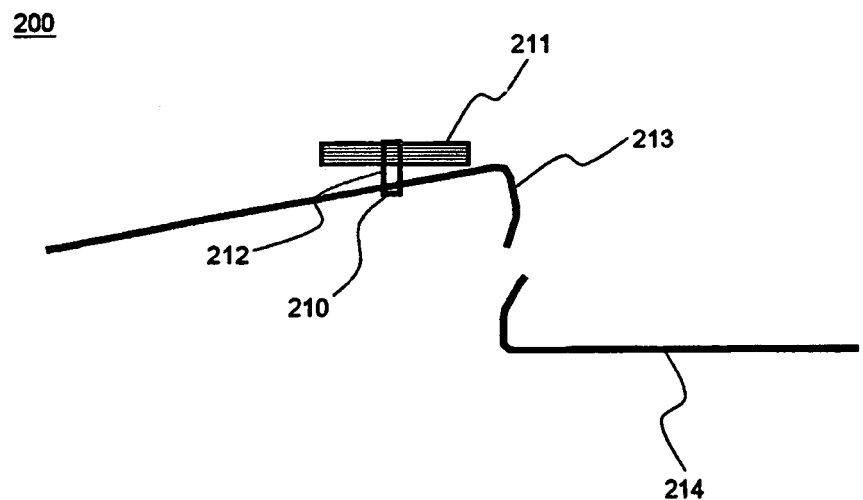

FIGS. 3 and 4 are typical views illustrating the concrete operating principle of the charge switch shown in FIG. 1. Specifically, FIG. 3 illustrates the state of the charge switch, during the normal operation of the battery, before the operation of the charge switch is performed, and FIG. 4 illustrates the state of the charge switch when the battery is abnormally operated, after the operation of the charge switch is performed.

Referring to FIGS. 3 and 4, the charge switch 200 is constructed in a structure in which two connection terminals 213 and 214 are in vertical contact with each other, one end of the heat shrinkage tube 212 is supported by the support shaft 211, and the other end of the heat shrinkage tube 212 is connected to the upper connection terminal 213 by the electric wire connection part 210. The upper connection terminal 213 is connected to an external device or an external input and output terminal, and the lower connection terminal 214 is connected to an electrode terminal of a battery cell (not shown). Consequently, the current conduction in the battery cell is accomplished only when the upper connection terminal 213 and the lower connection terminal 214 are connected to each other. When the upper connection terminal 213 and the lower connection terminal 214 are disconnected from each other, on the other hand, it is possible to charge the battery cell (not shown).

Therefore, when the battery is overheated with the result that temperature of the battery is excessively high, the heat shrinkage tube 212 of the charge switch 200 shrinks due to the high temperature of the battery. As a result, as shown in FIG. 4, the upper connection terminal 213 rises, and therefore, the two connection terminals 213 and 214, which are in vertical contact with each other, are disconnected from each other, with the result that the current is interrupted.

When the temperature of the battery decreases, on the other hand, the battery is brought into current conduction through the reverse process.

Figure 5:
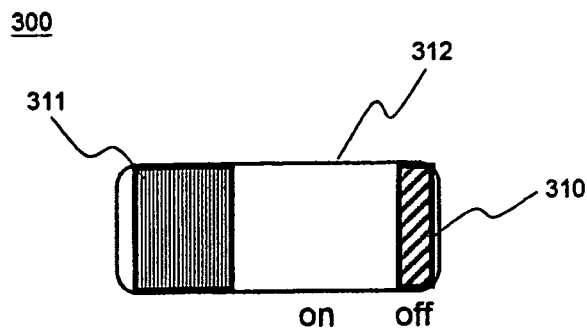
FIGS. 5 and 6 are typical views illustrating the operating principle of a safety switch (discharge switch) according to another preferred embodiment of the present invention.
Figure 6:
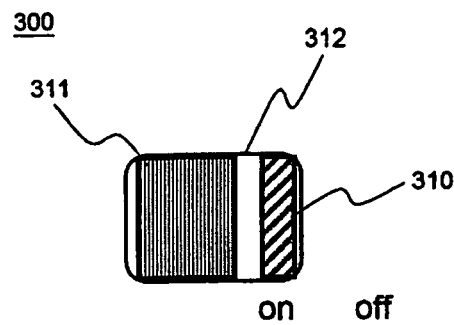

FIGS. 5 and 6 are typical views illustrating the operating principle of a safety switch according to another preferred embodiment of the present invention. Specifically, FIG. 5 illustrates the state of the safety switch, during the normal operation of the battery, before the operation of the safety switch is performed, and FIG. 6 illustrates the state of the safety switch when the battery is abnormally operated, after the operation of the safety switch is performed. For convenience of description, the safety switch shown in FIGS. 5 and 6 will be hereinafter referred to as a discharge switch.

Referring to FIGS. 5 and 6, the discharge switch 300 is constructed in a structure in which one side of a heat shrinkage tube 312 is fixed by a support shaft 311, and the other side of the heat shrinkage tube 312 is connected to an electric wire connection part 310. The electric wire connection part 310 is in current interruption (OFF) during the normal operation of the battery. When the battery is overheated, the electric wire connection part 310 is brought into current conduction (ON) due to the shrinkage of the heat shrinkage tube 312 of the discharge switch.

Figure 7:
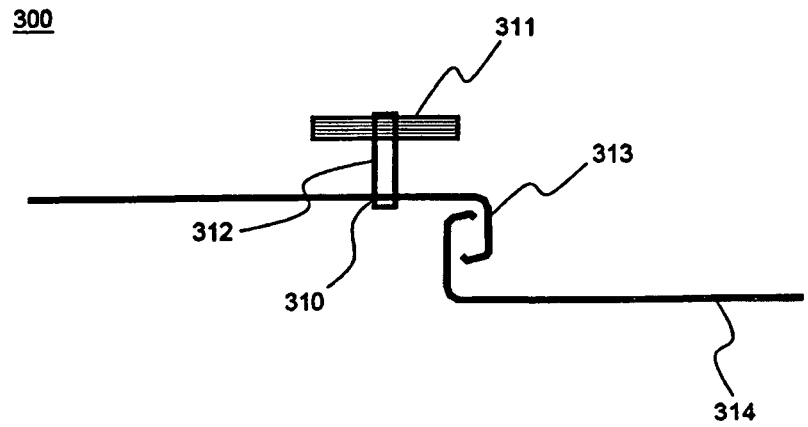
FIGS. 7 and 8 are typical views illustrating the concrete operating principle of the discharge switch shown in FIG. 5.
Figure 8:
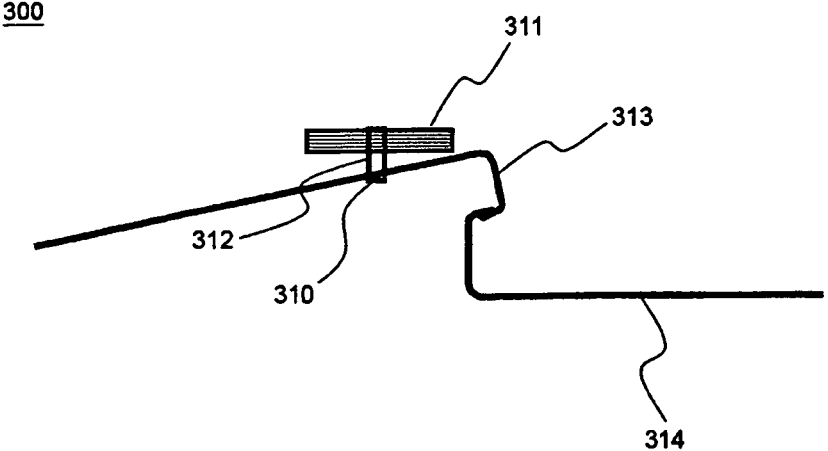

FIGS. 7 and 8 are typical views illustrating the concrete operating principle of the discharge switch shown in FIG. 5. Specifically, FIG. 7 illustrates the state of the discharge switch, during the normal operation of the battery, before the operation of the discharge switch is performed, and FIG. 8 illustrates the state of the discharge switch, when the battery is abnormally operated, after the operation of the discharge switch is performed.

Referring to FIGS. 7 and 8, the operating process of the discharge switch 300 is different from that of the charge switch shown in FIGS. 3 and 4 in that two connection terminals 313 and 314 of the discharge switch 300 are adjacent to each other, while the connection terminals 313 and 314 are spaced apart from each other, i.e., in current interruption, when the battery is normally operated, and the connection terminals 313 and 314 are connected to each other when the battery is abnormally operated. Consequently, electric energy accumulated in the battery cell is consumed through the current conduction only when the upper connection terminal 313 and the lower connection terminal 314 are connected to each other.

Figure 9:
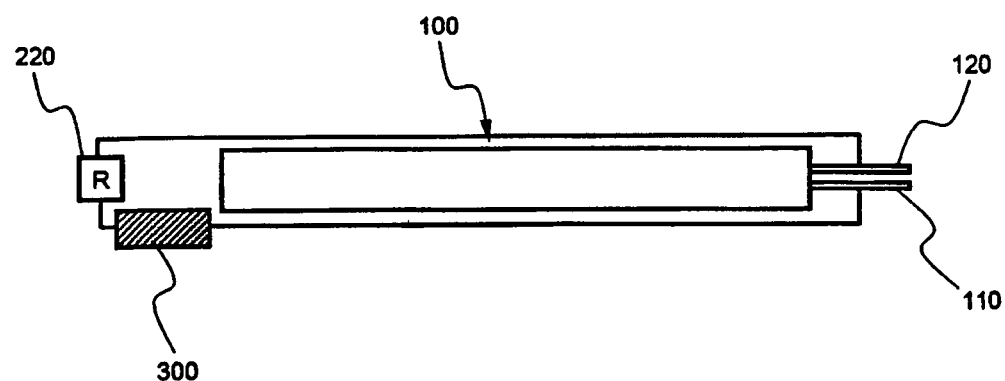
FIGS. 9 and 10 are typical views respectively illustrating a small-sized battery pack and a middle- or large-sized battery pack including the discharge switch shown in FIG. 7.
Figure 10:
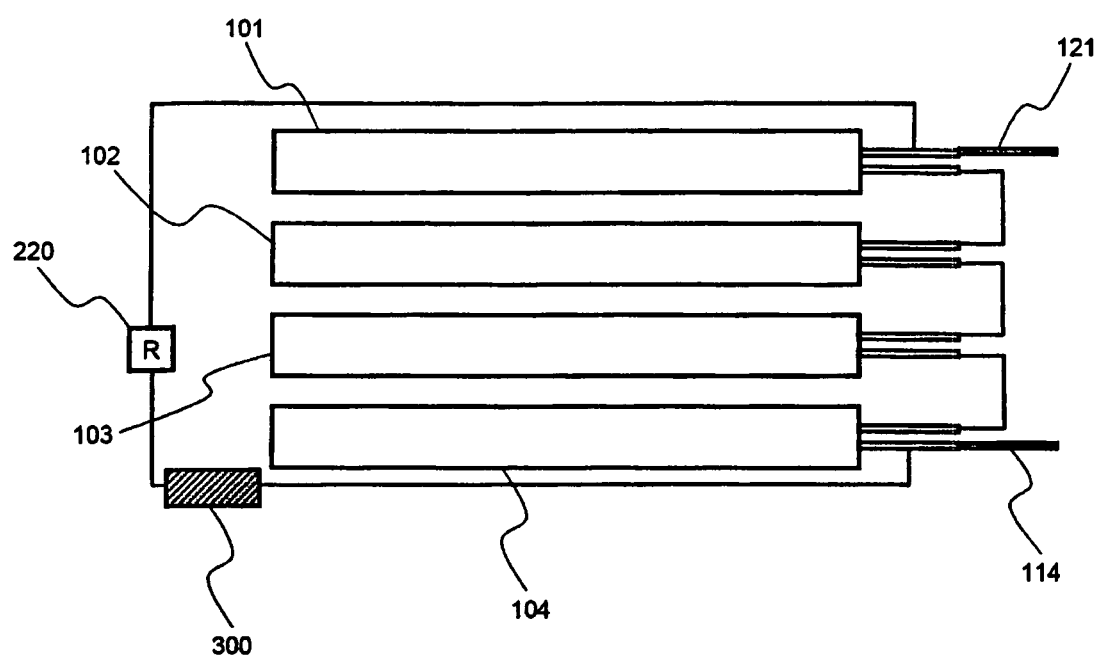

FIGS. 9 and 10 are typical views illustrating a battery including the discharge switch shown in FIG. 7. Specifically, FIG. 9 illustrates a single battery cell, to which the discharge switch is mounted, and FIG. 10 illustrates a middle- or large-sized battery pack including a plurality of battery cells stacked to provide high output and large capacity, to which the discharge switch is mounted.

Referring first to FIG. 9, opposite ends of the discharge switch 300 are connected in series with a cathode 110 and an anode 120 of the battery cell 100. Between the anode 120 of the battery cell 100 and the discharge switch 300 is connected a resistor 220.

Referring to FIG. 10, the plurality of battery cells 101, 102, 103 and 104, as unit cells, are sequentially stacked, and the discharge switch 300 is mounted outside of the unit cells 101, 102, 103, and 104. One end of the discharge switch 300 is connected to an anode terminal 121 of the first battery cell 101, and the other end of the discharge switch 300 is connected to a cathode terminal 114 of the fourth battery cell 104. Between the anode terminal 121 of the first battery cell 101 and the discharge switch 300 is connected a resistor 220. Consequently, when at least one of the battery cells 101, 102, 103 and 104 is overheated, the current conduction occurs in the discharge switch 300, whereby electric energy of the battery pack is consumed through the resistor 220.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the heat shrinkage tube of the safety switch shrinks to operate the switch of the battery, when the secondary battery is overheated due to abnormal operation of the battery, whereby external charge current is interrupted, and therefore, the further charge of the battery is prevented. Furthermore, internal energy of the battery is consumed by the resistor, whereby the safety of the battery is secured.

What is claimed is:
1. A secondary battery comprising a safety switch wherein:
(A) the safety switch comprises a heat shrinkage tube that shrinks when exposed to temperatures in excess of a predetermined temperature level as a member for securing the safety of the battery when the battery is overheated ("safety member") and which is mounted at the outside of a battery cell,
(B) in response to temperature the length of the heat shrinkage tube is changeable to control current conduction,

(C) the cross-section of the heat shrinkage tube is constructed in the form of a geometrical hollow structure,
(D) a support member, as a fixing shaft, is located toward one end of the geometrical hollow structure, in the geometrical hollow structure, and
  (1) one end of the heat shrinkage tube is fixed, and a variable member, connected to an electric wire connection part, is located toward the other end of the geometrical hollow structure, in the geometrical hollow structure,
  (2) the other end of the heat shrinkage tube is connected to an electric wire connection part, such that current conduction or current interruption is accomplished by the change in length of the heat shrinkage tube when the heat shrinkage tube length is varied due to heat, and
wherein,
  (i) when the secondary battery is overheated, the heat shrinkage tube shrinks to convert the electric wire connection part into a current interruption state; and
  (ii) when the temperature of the secondary battery is lowered to a level not in excess of the predetermined level in (A), the heat shrinkage tube expands to its original state, thereby restoring the electrical wire connection, and,
(E) the heat shrinkage tube is made of one or more materials selected from a group consisting of polyethylene, polypropylene, polyvinyl chloride, polyethylene terephthalate, ethylene propylene rubber, isoprene rubber, chloroprene rubber, styrene butadiene rubber, nitrile butadiene rubber, and polytetrafluoroethylene.

2. The secondary battery according to claim 1, wherein the heat shrinkage tube is made of polyvinyl chloride.

3. The secondary battery according to claim 1, wherein the heat shrinkage tube shrinks at a temperature of at least 60 to 120° C.

4. The secondary battery according to claim 1, wherein the safety switch is connected to a cathode terminal and/or an anode terminal of the battery cell, as external input and output terminals of the battery cell, and the electric wire connection part at the connection region allows current conduction or current interruption in the battery cell through the operation of the safety switch.

5. The secondary battery according to claim 4, wherein the electric wire connection part is in current conduction (ON) during the normal operation of the battery cell, and the electric wire connection part is brought into current interruption (OFF), due to shrinkage of the heat shrinkage tube of the safety switch, when the battery cell is overheated, thereby controlling the charge condition of the battery cell.

6. The secondary battery according to claim 4, wherein the electric wire connection part is in current interruption (OFF) during the normal operation of the battery cell, and the electric wire connection part is brought into current conduction (ON), due to shrinkage of the heat shrinkage tube of the safety switch, when the battery cell is overheated, thereby controlling the discharge condition of the battery cell.

7. The secondary battery according to claim 6, wherein the electric wire connection part connects the cathode terminal and the anode terminal of the battery cell in series with each other, and at least one resistor is connected between the electric wire connection part and the corresponding electrode terminal, so as to control the discharge condition of the battery cell.

8. The secondary battery according to claim 7, wherein the resistor emits heat, during the current conduction at the electric wire connection part, to consume charge energy of the battery cell.

9. The secondary battery according to claim 8, wherein the resistor has a resistance value at which the total capacity of the battery cell is discharged in 10 seconds to 10 hours.

10. A battery pack comprising the secondary battery according to claim 1, applied to a battery pack having a battery cell mounted in a battery pack case.

11. The battery pack according to claim 10, wherein the battery pack includes two or more battery cells as unit cells.

12. The battery pack according to claim 11, wherein the battery pack is used as a power source for electric vehicles or hybrid electric vehicles.

13. The secondary battery according to claim 1, wherein the heat shrinkage tube is constructed in an elliptical or rectangular hollow cross-sectional structure.

* * * * *